United States Patent [19]
Gilliard

[11] 3,875,796
[45] Apr. 8, 1975

[54] APPARATUS FOR CONTINUOUSLY RECORDING SEA-FLOOR SEDIMENT CORER OPERATIONS

[75] Inventor: Thomas C. Gilliard, Kailua, Hawaii

[73] Assignee: The United States of America as represented by the Secretary of the Navy, Washington, D.C.

[22] Filed: June 13, 1974

[21] Appl. No.: 479,066

[52] U.S. Cl.................................. 73/170 A; 73/153
[51] Int. Cl.......................... G01n 1/00; G01v 9/00
[58] Field of Search............... 73/170 A, 170 R, 153

[56] References Cited
UNITED STATES PATENTS
3,561,546 2/1971 Craig ................................ 73/170 A
3,613,446 10/1971 Scott.................................. 73/170 A Primary Examiner—Richard C. Queisser
Assistant Examiner—Anthony V. Ciarlante
Attorney, Agent, or Firm—Richard S. Sciascia; Paul N. Critchlow

[57] ABSTRACT

The apparatus provides a continuous, timed record of corer orientation data including corer declination, inclination, vertical acceleration. A compass, bubble levels, an accelerometer and a clock continuously provide the data. Indicators for these mechanisms are disposed in the focal plane of a battery-driven motion picture camera coupled into a switching circuit which also includes camera lights. A switching mechanism using a magnetic reed switch energizes the camera, lights etcetera at the moment the corer is released to begin its free-fall into sediment penetration.

6 Claims, 6 Drawing Figures

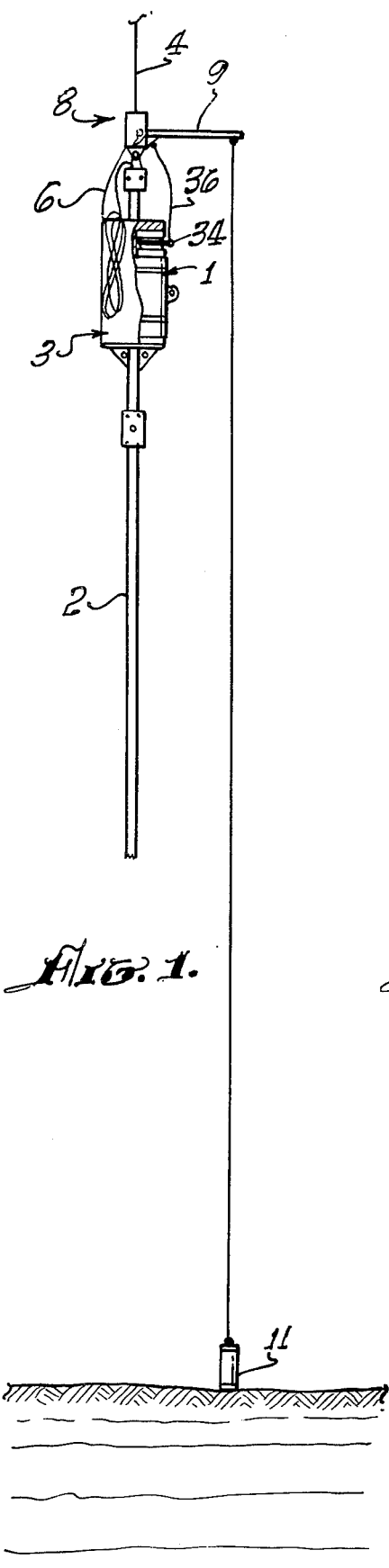
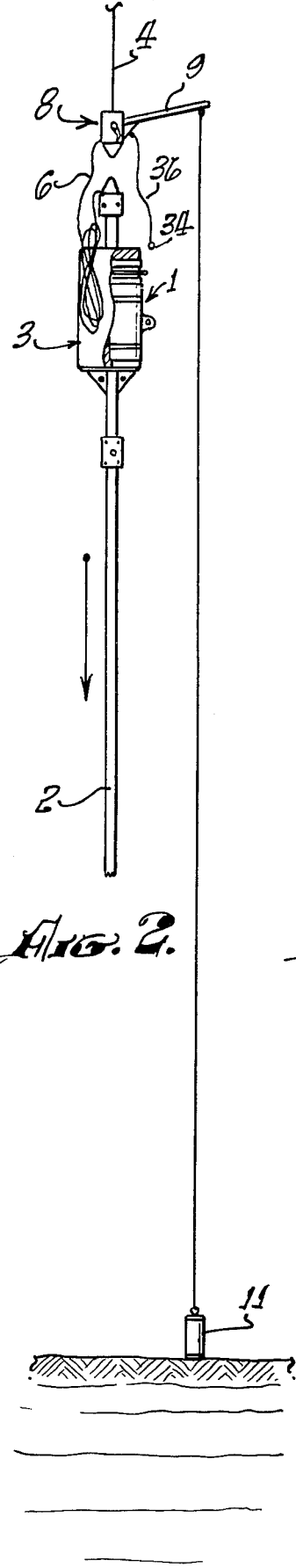
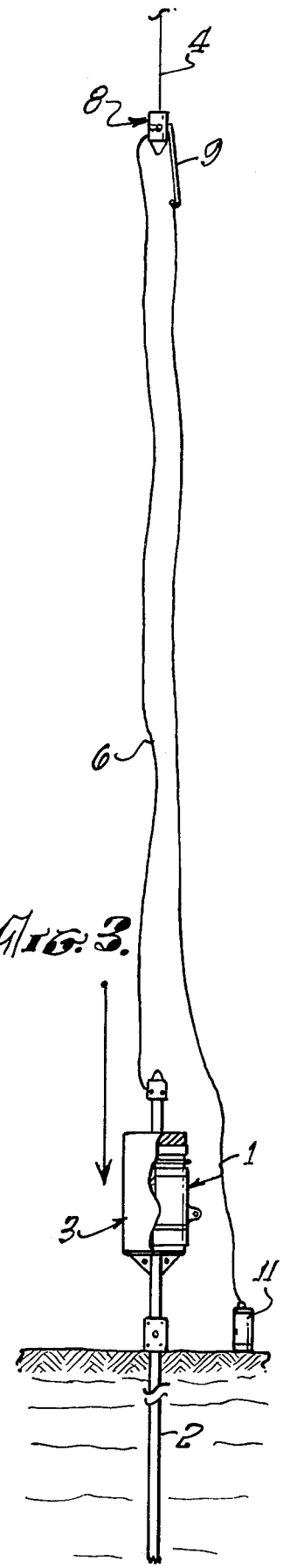

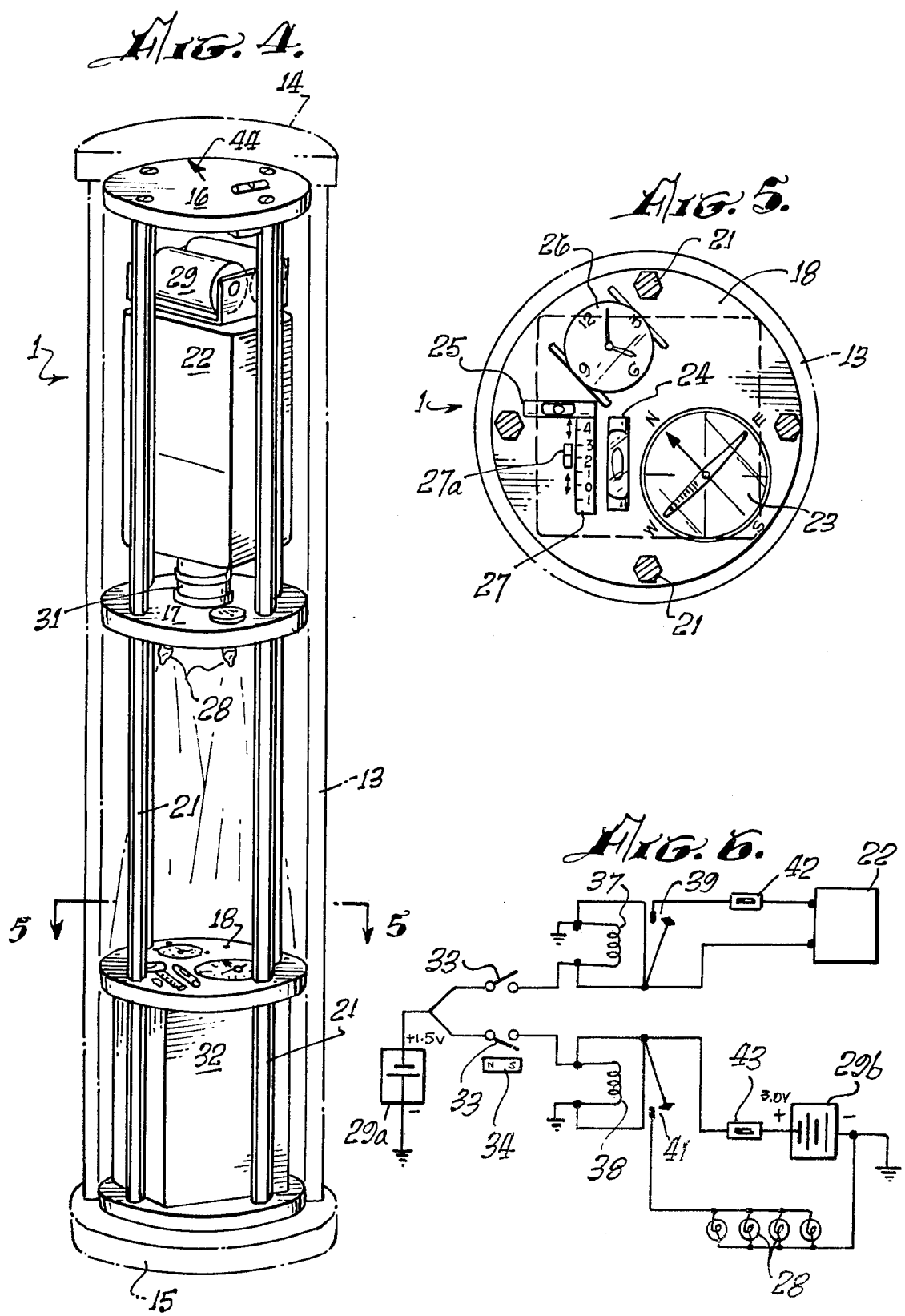

APPARATUS FOR CONTINUOUSLY RECORDING SEA-FLOOR SEDIMENT CORER OPERATIONS

BACKGROUND OF THE INVENTION

The present invention relates to sea-floor sediment corers and, in particular, to means for recording the orientation of the sea floor sediments as they are sampled on the ocean floor.

Careful investigation of the paleomagnetism of marine sediments is capable of yielding a great deal of valuable information and, for some time, there have been a number of investigators working in this field. However, since most of the sediments which have been collected from the ocean floor have been obtained with little or no knowledge of the orientation which these sediments hold with respect to the existing magnetic field, the work of these investigators has been quite narrowly restricted. In general, the limitations have resulted in a situation in which the principle application of paleomagnetism in the oceans simply has been as a tool by which to date the sediments by, for example, the identification of magnetic reversal bounderies. Such other data as has been made available has been of such a nature that its principle value has been simply to provide either a check on the validity of the magnetic reversals or to provide other information such as the soil strength of the sediments.

Although some corer orientation instruments have been developed, apparently none of these instruments have recognized the vital importance of providing all of the necessary data in a continuous manner so as to produce data which take into consideration all of the gyrations and dynamics of the weighted corer from the time it is released until the time it has penetrated the sediment and become immobile. Thus, for example, studies of piston core behavior indicate that the corer can undergo substantial rotation both during free-fall and penetration and, since the prior devices seems satisfied with what amounts to 'single shot' or isolated bit of data, they fail to accommodate the accompanying dynamics which certainly are matters that must be resolved. In other words, although some of these devices individually may employ such mechanisms as a compass, or inclinometer, or an accelerometer, they do not seem to provide all of the necessary data with sufficient continuity to produce presently useful orientation information

BRIEF SUMMARY OF THE INVENTION

The present invention mounts core orienting apparatus directly on the sediment corer and, in the particular manner to be described, provides the orienting apparatus with instrumentation capable of yielding declination, inclination and acceleration data continuously and in a continuously-timed manner both during the free-fall phase and the penetration phase of the corer. Recording means provide a substantially continuous recording that related the orientation data to the corer dynamics during the entire sediment-collecting operation. Special control mechanisms are provided to energize the recording means at the moment of the corer free-fall release. Further, as will be described, the preferred form of the invention contemplates particular structural features such as a suitable pressure casing, as well as a particular manner by which the casing is carried by the weight stand of the corer and a particular arrangement of elements which significantly improve the operation.

A primary object of the invention is to provide a simple, inexpensive and reliable core orienting apparatus capable of providing continuous data relative to the magnetic field of the sediment being collected by the corer and also, relative to the dynamics of the corer both during its free-fall and penetration phases.

A more specific object is to record continuously the magnetic declination of a corer and to simultaneously record data relative to acceleration, inclination and time such as will permit calculation of the displacement of the corer from the time of its release.

A related object is to provide an inexpensive, simple device that can be used as an instrument platform from which to evaluate the performance of triggered ocean bottom sampling devices.

BRIEF DESCRIPTION OF THE DRAWINGS

The invention is illustrated in the accompanying drawings of which:

FIGS. 1, 2 and 3 are sequential views illustrating the operation of a weighted corer mechanism which carried the present core orienting apparatus;

FIG. 4 is an enlarged perspective in elevation of the present core orienting device showing the operative mechanisms mounted within a partially broken-away pressure casing;

FIG. 5 is a view taken along lines 5—5 of FIG. 4, and

FIG. 6 diagramatically shows an electrical circuit for energizing the recording means.

DETAILED DESCRIPTION OF THE INVENTION

Referring to the sequential views of FIGS. 1, 2 and 3, it will be seen that the core orienting device, represented by numeral 1, is mounted on a sea-floor sediment corer which includes an elongate tube portion 2 carried by a weight stand 3 that, in turn, is releaseably suspended by an appropriate cable 4 extends upwardly to a winch or the like carried by a surface ship. The arrangement, of course, is one in which the cable can be paid-out or rewound to lower the corer into its operative position and to recover the corer after it has collected its sediment sample. As will be appreciated, the present orienting apparatus can be used with different types of corers such as the piston or gravity corers. As shown, it incorporates a lead weight carried by weight stand 3 to provide the force needed to drive tube 2 into the sediment for collection purposes.

The operation is conventional to the extent that the corer is lowered into its FIG. 1 position by cable 4 at which point a release mechanism, identified by numeral 8, is triggered automatically to initiate the free-fall shown in FIG. 2. Release mechanism 8 can be provided in any number of well-known manners. The particular mechanism shown employs a trigger arm 9 normally depressed by a weight 11, the trigger arm pivoting upwardly when weight 11 strikes the ocean bottom to activate release 8.

As also can be noted in FIG. 1, core orienting device 1 is wholly contained within the circumferential parameter of weight stand 3 both to protect the core orienting device and to minimize its loss during operation. For this purpose, a lead fill which provides the weight for weight stand 3 is specially formed to receive the core orienting device. In particular, the lead fill, as well as the weight stand, is provided with an 80° pie-shaped segment into which the device is fitted. Other mounting arrangements obviously can be used providing the necessary protection against loss or damage provided. In this regard, it is recognized that the deployment and recovery of the corers may involve some rather rough handling which, without the use of protective arrangements, can easily result in loss or damage.

Referring to FIGS. 4 and 5, it will be noted that the present device generally is formed of various instruments or mechanisms carried in an elongate tube or pressure casing 13 formed of some strong, non-corrosive metal such as aluminum. The casing is a cylinder closed at its ends with plates 14 and 15 one of which, preferably, is removable to permit the interior mechanisms to be maintained or adjusted. The interior mechanisms are mounted and supported on a frame-like structure formed of a plurality of circular plates 16, 17, 18 and 19 secured by vertical rods 21, the entire structure being fitted closely within the pressure casing.

As has been emphasized, one feature of the invention resides in its capability of continuously recording the magnetic declination of the sediment core as core tube 2 penetrates the ocean bottom. Of equal significance, it also records the behavior of a vertical accelerometer, inclinometer and a clock, continuously during the entire free-fall and the penetration phases. For this purpose, the device utilizes a battery-powered M-26 Kodak motion picture camera 22 focused on indicating mechanisms which include a compass 23, bubble levels 24 and 25, a clock 26 and an accelerometer indicator 27. Illumination for the camera is provided by a plurality of flashlight bulbs 28. Preferably, the camera is operated at a film speed of about 18 frames per second so that a 50 foot roll of film is exposed in about 3½ minutes which is an adequate period of time within which to continuously record the free-fall and penetration phases of the corer. The photographic record of clock 26 is a critical part of the invention since it can be used as a check on the film speed and also in conjunction with the other data to obtain necessary information relative to the precise instant at which significant events or phenomena occur. Such a timed sequence is of considerable importance both in the paleomagnetism applications or, more simply, in evaluating and improving the performance of triggered sediment sampling devices.

Considering the FIGS. 4 and 5 arrangement in greater detail, it will be noted that camera 22 is supported in the upper portion of the casing between plates 16 and 17 and between the portions of rods 21 extending through this upper portion. A battery pack 29 is mounted on top of the camera to provide a source of energy for flashlight bulbs 28 and, if needed, for the motor of camera 22. Camera lens 31 projects through plate 17 to provide further support and stability for the camera and in practice, it is preferred to use two No. 3 portrait lenses prefocused at 5¾ inches from the indicating mechanisms which the camera photographically records. More specifically, it will be noted that these indicating mechanisms including the clock, the compass, the bubble levels and the accelerometer scale all are mounted on circular plate 18 which, in turn, is disposed 5¾ inches from the camera lens.

Another feature of the present invention is the fact that the continuous recording of the essential data is achieved by an instrument which itself is unusually simple and inexpensive not only for the purpose of encouraging wide-spread use but also to promote reliability and consistency in its performance. For these purposes, it is preferred to use a simple compass such as the one illustrated in FIG. 5 and simplified inclinometer mechanism such as the pair of bubble levels 24 and 25 arranged at right angles one to the other. In addition, an ordinary clock or watch 26 is employed. Also shown in FIG. 4, an accelerometer 32 is mounted in the lower portion of pressure casing 13 to generate the data indicated on accelerometer scale 27. More specifically, the accelerometer is mounted in an aluminum case 32 which is supported on circular plate 19 between vertical rods 21. Also, in a conventional manner, the accelerometer case is filled with a Dow Corning silicon oil to provide a damping that is temperature insensitive. The actual accelerometer mechanism is not illustrated since it may be provided in a number of conventional manners. One form, for example, that has been successfully used consists simply of an aluminum weight suspended on a Bendix Flexural Pivot which provides a linear spring rate. Movements of a bob are mechanically amplified by a suitable lever arm to operate indicator needle 27a shown in FIG. 5. As will be appreciated, a number of other types of accelerometer devices, such as strain gauges or electrical accelerometers, can be employed. Also, other mechanisms can be used in lieu of the compass, etcetera. For example, a gyro compass can be employed in lieu of the simple compass shown in FIG. 5 and the inclinometers can, if desired, be in the form of electrical accelerometers. Further, movie camera 22 primarily is for the purpose of providing a continuous record and such a record also could be provided by tape or paper recorders. However, although these substitutions obviously would satisfy the functional requirements, they also present complications that materially increase the complexity and expense of the device. The presently preferred configuration is that which has been shown and described since it represents the simplest, least expensive and most easily maintained system for producing the necessary information.

FIG. 6 illustrates an electrical circuit used to control both the camera and the lights. To understand more the FIG. 6 circuit it first should be recalled that operation of the device contemplates initiation of the camera recording at the moment the corer is released for free-fall by release mechanism 8. For this purpose, a magnetic reed switch having switch arms 33 is incorporated in the FIG. 6 circuitry and this switch is controlled by a bar magnetic 34 which normally holds the switch arms in the illustrated, opened position. The arms are yieldably urged toward a closing position so that removal of the magnet permits the closing action. Removal of magnet 34 is achieved in a manner illustrated in FIG. 1 and 2. Thus, referring to FIG. 1, magnet 34 is secured to a lanyard 36 which in turn is coupled to the portion of release mechanism 8 which is retained by cable 4 when the corer is released for free-fall. Consequently, when the release of the corer occurs, lanyard 26 is tensioned and bar magnet 34 is pulled free of the casing of the core orienting device.

Referring again to FIG. 6, closing of switch arms 33 by removal of magnet 34 closes the circuit between a 1.5 volt battery 29a to coils 37 and 38 to close switches 39 and 41 disposed in the camera and light circuits. Closing of these switches supplies the power for operating the camera and the lights. Manual switches 42 and 43 also are included in the camera and light circuits and, as will be appreciated, these switches are turned on prior to the lowering of the corer. Manifestly, other devices, for example, including time delays, mechanical switches or electrical contacts could be substituted.

The operation of the corer orienting device should be reasonably clear from the foregoing description. Briefly reviewed, once the corer orienting device is securely and protectively mounted in the weight stand of the corer, the entire arrangement is lowered from the ship by cable 4 into positions shown in FIG. 1. At this point, the gravity pull of weight 11 on trigger arm 9 of the release mechanism is relieved to permit trigger arm 9 to pivotally activate the release and permit the free-fall shown in FIG. 2. At the precise moment of the release, magnet 34 is pulled from the device to start the camera and the lights. Also beginning at this precise moment, a continuous record at 18 frames per second is provided for a period of about 3½ minutes, this record producing declination, inclination and acceleration data in a time sequence permitted by clock 26. The combination of all of this information is highly important as is the continuity which provides constant orientation data regardless of corer rotation or other gyrations. In fact, the availability of this type of data provides apparently for the first time a basis for expanding the important investigations and studies of marine paleomagnetism.

It further may be noted that the present invention provides an orientation mark 44 on upper plate 16. This orientation mark provides a reference to indicate the initial disposition of the corer so that data obtained during operation can be related to this disposition.

Obviously many modifications and variations of the present invention are possible in the light of the above teachings. It is therefore to be understood that within the scope of the appended claims the invention may be practiced otherwise than as specifically described.

I claim:

1. Apparatus for chronologically recording the orientation of the sea-floor sediment corer during its free-fall and penetration phases, the apparatus comprising:

a sediment core-collector tube, suspension means for lowering said tube to the sea floor, a pressure casing carried by said tube, means protectively mounted in said pressure casing for continuously detecting and timing the declination, inclination and acceleration of said core-collector tube during its free-fall and penetration phases, and recording means protectively mounted in said pressure casing for continuously recording said individual indications.

2. The apparatus of claim 1 wherein said recording means is provided by a powered motion picture camera means, and said detecting means includes:

means for individually indicating said time, declination, inclination and acceleration, said indicating means being mounted in the focal plane of said camera means and said camera having a fixed film speed whereby said indications are recorded in a timed frame-by-frame sequence.

3. The apparatus of claim 2 wherein said suspension means includes means for releasing said core-collector tube at a pre-selected free-fall position above said sea-floor, said apparatus further including:

switch means for energizing said camera means, and means responsive to said release means for controlling said switch means whereby said camera means is operatively-driven during said free-fall and penetration phases.

4. The apparatus of claim 3 wherein said camera means includes means for illuminating said indicating means, said illuminating means also being controlled by said switch means.

5. The apparatus of claim 3 wherein said switch means includes a magnetic reed switch.

6. The apparatus of claim 4 wherein said timing means is a watch, said declination detector is a compass, and said inclination detector is a pair of bubble levels disposed normal one to the other.

* * * * *